United States Patent
Kozlowski

(10) Patent No.: US 11,847,737 B2
(45) Date of Patent: Dec. 19, 2023

(54) TEMPORAL DENOISER QUALITY IN DYNAMIC SCENES

(71) Applicant: Nvidia Corporation, Santa Clara, CA (US)

(72) Inventor: Pawel Kozlowski, Truckee, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/226,820

(22) Filed: Apr. 9, 2021

(65) Prior Publication Data

US 2022/0327771 A1    Oct. 13, 2022

(51) Int. Cl.
| | | |
|---|---|---|
| *G06T 15/80* | (2011.01) | |
| *G06T 1/20* | (2006.01) | |
| *G06T 15/00* | (2011.01) | |
| *G06T 5/00* | (2006.01) | |
| *G06T 5/50* | (2006.01) | |

(52) U.S. Cl.
CPC ............. *G06T 15/80* (2013.01); *G06T 1/20* (2013.01); *G06T 5/002* (2013.01); *G06T 5/50* (2013.01); *G06T 15/005* (2013.01)

(58) Field of Classification Search
CPC ................................ G06T 5/002; G06T 15/06
See application file for complete search history.

(56) References Cited

U.S. PATENT DOCUMENTS

| | | | | |
|---|---|---|---|---|
| 6,226,327 B1* | 5/2001 | Igarashi | ................. | H04N 19/61 375/E7.25 |
| 9,418,469 B1* | 8/2016 | Parmar | ................. | G06T 13/00 |
| 10,044,913 B2* | 8/2018 | Vanam | ................. | H04N 9/646 |
| 11,182,887 B2* | 11/2021 | Kang | ................. | G06T 5/50 |
| 2003/0081672 A1* | 5/2003 | Li | ................. | H04N 19/196 375/E7.14 |
| 2003/0120365 A1* | 6/2003 | Asano | ................. | H04N 7/0132 700/86 |
| 2004/0227851 A1* | 11/2004 | Min | ................. | H04N 7/014 348/E7.013 |
| 2005/0157938 A1* | 7/2005 | Kondo | ................. | G06T 7/254 382/254 |
| 2009/0109238 A1* | 4/2009 | Yin | ................. | H04N 5/144 345/600 |
| 2009/0295706 A1* | 12/2009 | Feng | ................. | G09G 3/3426 345/102 |
| 2011/0051005 A1* | 3/2011 | Wu | ................. | H04N 5/213 348/E5.078 |

(Continued)

OTHER PUBLICATIONS

Development Methods for Hybrid Motion Detection (Frame Difference-Automatic Threshold), Wirayuda et al., 2013 (Year: 2013).*

*Primary Examiner* — Yingchun He

(74) *Attorney, Agent, or Firm* — Hogan Lovells US LLP

(57) ABSTRACT

Apparatuses, systems, and techniques are presented to reduce temporal lag when a dynamic event is occurring in computer generated video. In one embodiment, a first averaging algorithm is utilized to determine a display value for a pixel based at least in part on previous pixel values. Once a dynamic event is detected, a set of the previous pixel values is averaged using a second averaging algorithm. The pixel value is updated based on the first averaging of the pixel values and the second averaging of the pixel values to determine a current pixel value.

20 Claims, 14 Drawing Sheets

(56) References Cited

U.S. PATENT DOCUMENTS

| | | | |
|---|---|---|---|
| 2012/0027319 A1* | 2/2012 | Hu | G06T 5/002 |
| | | | 382/275 |
| 2013/0342537 A1* | 12/2013 | Vorhies | G06T 17/05 |
| | | | 345/428 |
| 2014/0294320 A1* | 10/2014 | Kokaram | H04N 19/597 |
| | | | 382/300 |
| 2015/0304680 A1* | 10/2015 | Ling | H04N 19/139 |
| | | | 375/240.16 |
| 2016/0148054 A1* | 5/2016 | Han | G06T 7/269 |
| | | | 382/103 |
| 2017/0272722 A1* | 9/2017 | Salvi | H04N 13/122 |
| 2018/0096516 A1* | 4/2018 | Luebke | G06T 15/06 |
| 2019/0180470 A1* | 6/2019 | Otte | F41J 9/14 |
| 2020/0118244 A1* | 4/2020 | Croxford | G06T 1/20 |
| 2022/0148256 A1* | 5/2022 | Liu | G06T 5/50 |
| 2022/0222780 A1* | 7/2022 | Kozlowski | G06T 5/20 |
| 2022/0255653 A1* | 8/2022 | Ferdowsi | H04J 3/025 |

* cited by examiner

FIG. 3D

| 364 | 363 | 362 | 361 | 360 |
|---|---|---|---|---|

SMA ← → EMA

FRAME 60

FIG. 3E

| 365 | 364 | 363 | 362 | 361 | 360 |
|---|---|---|---|---|---|

SMA ← → EMA

FRAME 61

FIG. 3F

| 365+N | 364+N | 363+N | 362+N | 361+N | 360+N | 359+N | PREVIOUS FRAMES |
|---|---|---|---|---|---|---|---|

SMA ← → EMA

FRAME N+61

TEMPORAL DENOISER QUALITY IN DYNAMIC SCENES

FIELD

The present application relates generally to improved performance in computer generated graphics. Particularly, the present application is directed to improving rendering of images that include pixels with rapidly changing values.

BACKGROUND

Pixels representing moving objects in computer generated video graphics often suffer from noise due to the rapid changing values of the pixels. For example, in instances where a light source is changing positions quickly, blur can occur at the edges of shadows cast by the light due to the computations required to update pixel values quickly to compensate for the effects of the shadow. Typically, a value for a pixel that is changing over time is determined based on a moving average, such as an exponential moving average (EMA). While resource-efficient, this method can lead to lag when changes in the pixel value are rapid between frames. Another method for calculating a pixel value is a simple moving average (SMA), which, although more computationally expensive, results in less lag when a pixel changes values rapidly.

BRIEF DESCRIPTION OF THE DRAWINGS

FIGS. 3A-3F illustrate an example implementation of one or more embodiments;

DETAILED DESCRIPTION

Figure 1A:
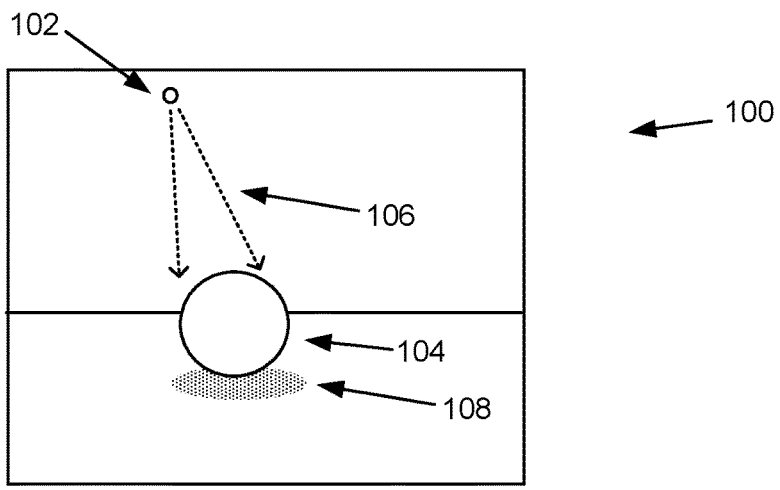
FIGS. 1A, 1B, and 1C illustrate example shadows that can be cast in computer animation, in accordance with at least one embodiment.
Figure 1B:
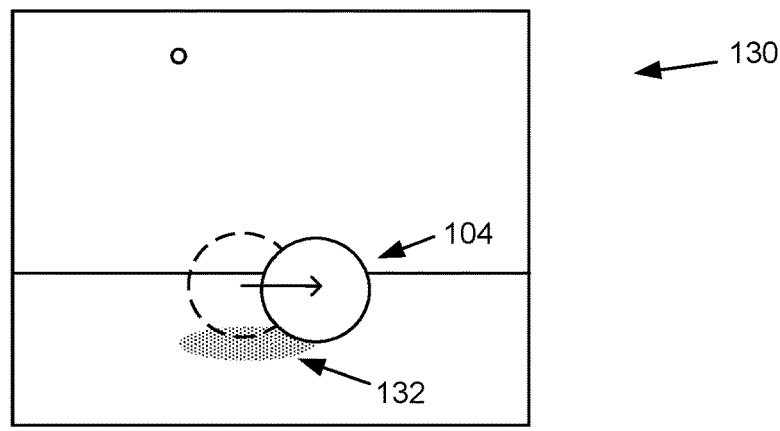
Figure 1C:
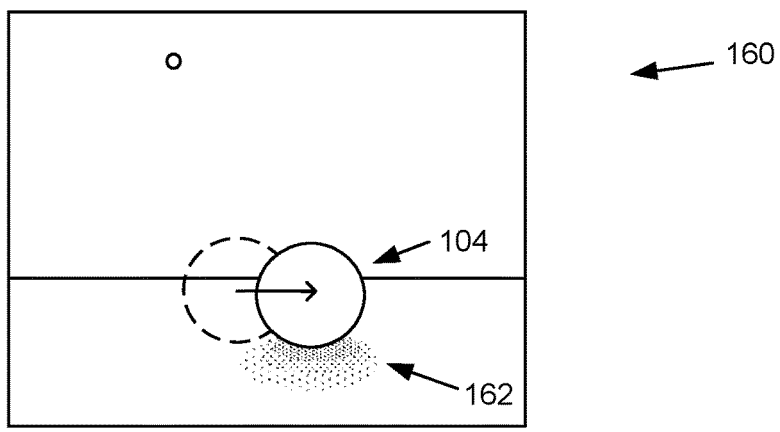

When generating image or video content for dynamic scenes, stochastic techniques can be used to provide realistic movement. An example stochastic technique can attempt to minimize uncertainty in positions of objects in an image frame for a dynamic scene by utilizing data from past image frames and determining various probabilities of position. For example, consider the image frame 100 of FIG. 1A. In this frame, there is a light source 102 and an object, such as a sphere 104, that is illuminated by that light source 102. In order to cause the image frame 100 to appear more realistic, a series of rays 106 can be cast or traced from that light source 106 that intersect the sphere 104, and can cause a shadow 108 to be cast onto an underlying surface. Such an approach can work well for a single frame with static objects. As illustrated in subsequent image frame 130 of FIG. 1B, however, objects such as the sphere 104 may move between frames. In addition to moving the sphere, a rendering engine generating these image frames can have to determine how to adjust the shadow to move along with the ball. In order to provide for smooth motion and appearance, and reduce a presence of noise, some amount of pixel blending can be performed with respect to one or more prior frames. As illustrated in FIG. 1B, however, this can result in at least some amount of temporal lag, where a rendered shadow 132 will appear to lag behind the sphere as it moves. To eliminate this temporal lag the rendering engine could avoid blending and only cast rays based on a current frame 160 that represents motion of that sphere 104, as illustrated in FIG. 1C, but such an approach tends to generate a noisy shadow 162 that does not appear realistic or smooth for that dynamic scene.

Typically, a value for a pixel in computer generated video is calculated from a number of values for the pixel, including past values for the pixel. By averaging a value for pixel over time to determine a current value for the pixel, a more accurate representation of an object is possible with a reduction in jagged edges and anomalies that may otherwise manifest due to rapid movements in the video. For example, a typical computer generated video may have a frame rate of 60 frames per second, wherein a value of a pixel may change repeatedly throughout that set of frames. If an object or light source is rapidly changing position, values for pixels alone for a frame may result in inconsistent rendering of the object over the set of frames. Further, an object (or a shadow cast by an object) that is rapidly changing may result in lag because movement is too rapid for the rendering of the object to keep up with the calculated movement of the object.

In typical instances, an exponential moving average (EMA) may be utilized to find a value for a pixel based on previous values for the pixel, thus smoothing out the value of the pixel over time, especially in instances with significant movement. While an EMA for a pixel value may be sufficient in most circumstances, using EMA where pixels are rapidly changing may result in lag in the displayed movement of the object. However, EMA is a relatively inexpensive averaging method that requires less computing power and memory.

Figure 2:
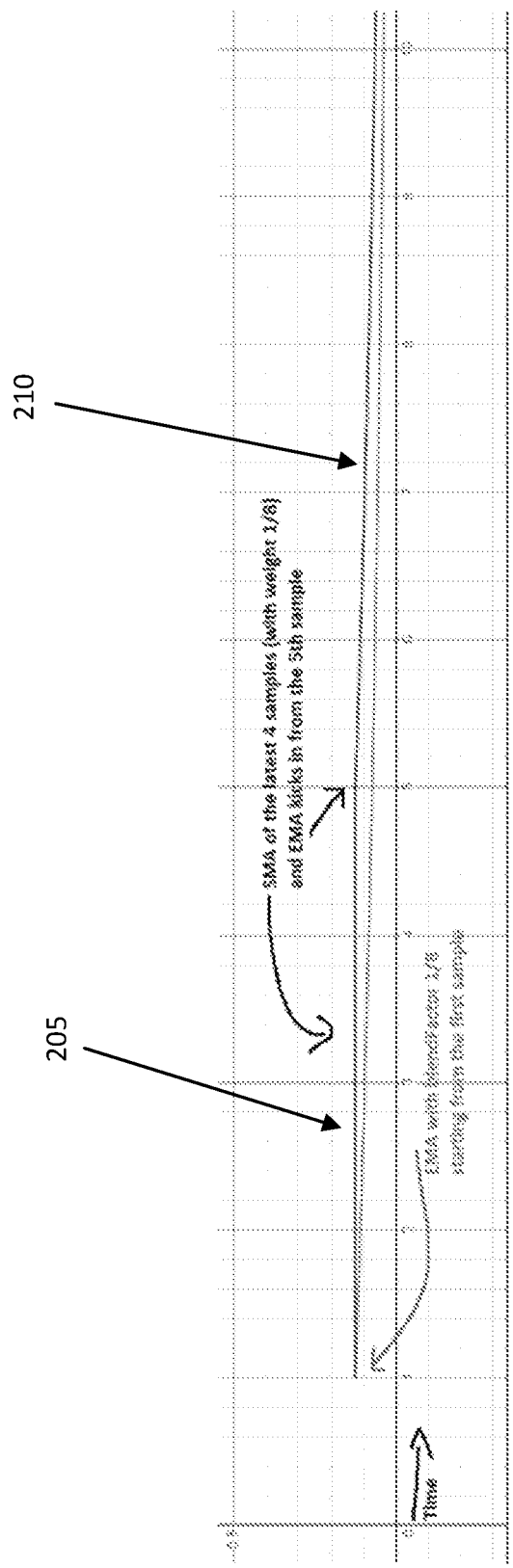
FIG. 2 illustrates an example of an exponential moving average calculation for a pixel value over a series of frames and an example of a hybrid moving average for a pixel value over a series of frames.

For example, referring to FIG. 2, a graph is provided that illustrates the contribution of previous pixel values over a series of frames to determine a current pixel value. As illustrated, the contribution of a previous pixel value diminishes over time. Thus, an exponential decay is utilized to minimize the contribution of pixels in more distant frames from a current frame. For example, the contribution of a pixel value in the previous frame to the current frame contributes more to the current pixel value than a pixel value in a frame before the previous frame. The result is an accurate representation of a current pixel value. However, because a larger number of frames contributes to the current pixel value, rapid changes in values become averaged over a longer set of values, which may result in lag.

A Simple Moving Average (SMA) may also be utilized to determine a value of a pixel based on past values. When using an SMA, the contribution of all previous values is averaged such that all values have equal weight when calculating a current value. This results in a more accurate current value for the pixel, but is more resource intensive to calculate. For example, a current value of a pixel that is calculated using SMA may have 10% of its value calculated from each of the 10 previous frames. Performing such an average would be prohibitively expensive for the number of pixels that require constant calculations and memory. Thus, SMA inefficient for use constantly for pixel value calculations.

Embodiments provided herein use a hybrid approach to calculating pixel values when lag would otherwise be introduced when an EMA approach is employed. A window of recent frames (i.e., values of pixels over the frames) is calculated using a SMA and an EMA is used for a second window of frames. For example, referring again to FIG. 2, a graph is provided that illustrates the hybrid approach of one or more of the embodiments herein. The graph includes an SMA portion 205 and an EMA portion 210. The SMA is calculated, for illustration purposes only, over a window of the 4 most recent frames. The remaining frames (i.e., the EMA portion 210) uses an EMA for the remainder of the contribution of previous pixel values to the current pixel value.

Embodiments disclosed herein use a hybrid approach that combines both an SMA portion and an EMA portion. When a dynamic event is detected, an SMA approach should be utilized, and the EMA portion may be dropped so that it no longer contributes to the display value for a pixel. For example, in instances when lag is likely, such as from a rapidly moving light source that is casting a shadow on an object, the SMA approach may be utilized to reduce lag in rendering of the moving shadow. Thus, while calculating pixel values using the hybrid approach, rapidly changing pixel values may be identified between video frames, the pixel value calculation method may be changed to from the hybrid approach to an SMA approach. When the rapidly changing pixel values are no longer occurring for those pixels, the method of calculating values using the hybrid approach may resume. Doing so reduces lag in those pixels over time when needed and the cost to reducing lag is reduced.

Embodiments described herein reduce lag by determining an average display pixel for a pixel based on a hybrid average of SMA and EMA over values of the pixel in previous frames, and switching to an SMA-only approach when a dynamic event is identified. In some illustrative embodiments, systems and methods use SMA and EMA as part of algorithms to determine display values for pixel locations in multiple frames of a computer-simulated video, and such determination can involve one or more previous pixel values, updated lists thereof, and averages for given locations in the video. Pixel temporal lag between frames can then be determined, potentially with features including supplemental pixel information for additional frames and/or the use of a temporal lag threshold.

Referring to FIG. 3A-3F, a diagram is provided illustrating a series of pixel values that may be utilized over time to determine a new pixel value in accordance with one or more embodiments disclosed herein. Each of the pixels illustrated may be utilized to determine a display value for the pixel. For example, a value may be calculated for a pixel that is determined based on the illustrated pixel values. In some embodiments, only a final average pixel value is stored, which then may be utilized to determine the next pixel display value. Also, for example, the SMA values may be stored as each is received and the EMA values for the pixels may be stored as a single value, which is updated as additional pixel values are received.

Figure 3A:
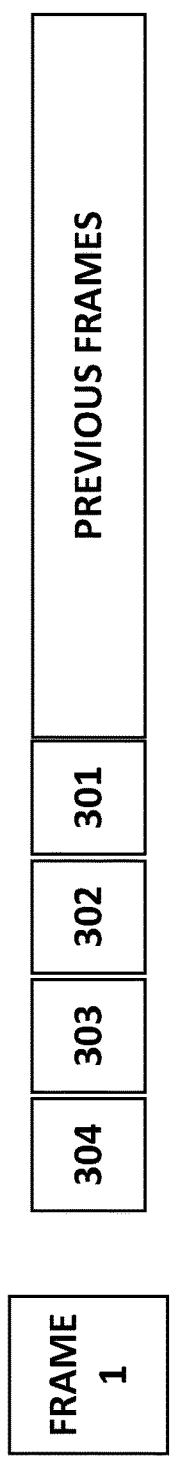

As illustrated in FIG. 3A, the list of frames 300 are an example of pixel values for a pixel over time, with each pixel value represented by pixels 301 . . . 304. Pixel value 304 (as disclosed, herein, pixel value may also be referred to as "pixel") is the most recent value for a particular pixel in a frame of video. Pixel value 301 is the value of the pixel as received for the pixel 3 frames previous to the current frame. Thus, for each pixel 301 . . . 304, the list of frames constitutes a historical value for the pixel as the value changes from frame to frame. This may be stored as a single value. The value of a pixel in a frame may be determined by one or more components described and illustrated in FIGS. 2-5 and described above.

As illustrated in FIG. 3A, a hybrid approach is utilized to determine a display value for a pixel in frame 1. The value is determined utilizing an SMA approach for 4 frames (i.e., 301 . . . 304) and an EMA approach for other previous frames that were received prior to the frame where the pixel had the value 301. As new values are received, as illustrated in FIG. 3B, the oldest value in the SMA portion is moved to the EMA portion, which may then be utilized to recalculate the EMA portion.

Figure 3B:
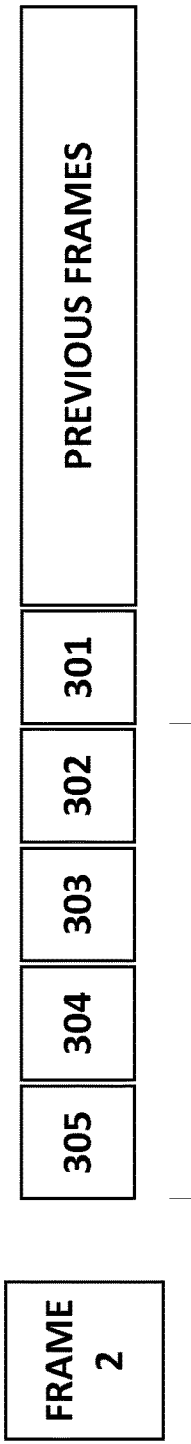

Regarding the "previous frames" portion of the FIGS. 3A and 3B, the portion is displayed as being a list of individually stored values. In some embodiments, the "previous frame" portion that is calculated by EMA may instead be a single value that is stored and then updated each time a new value is received. Thus, for example, in FIG. 3B, "previous frames" may be a single stored value. When 301 is received, that pixel value as well as the saved "previous frames" value may be utilized to calculate a new "previous frames" value. This may continue until the EMA portion is dropped, as described below.

Figure 3C:
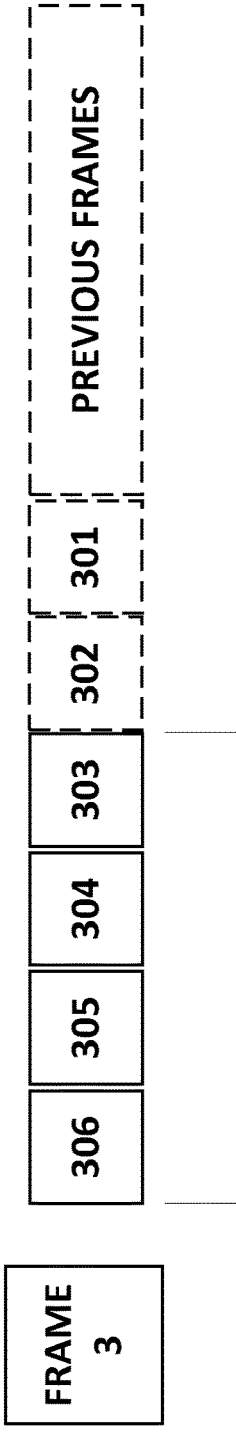

Referring to FIG. 3C, a dynamic event may be detected at frame 3. This may be, for example, based on a difference between a most recently received frame and one or more previous received frame values. In this instance, the previous values (including 301 and 302, which are now past the 4-frame SMA window) are dropped from the calculation of the current display pixel value. Instead, only the SMA portion (in this example, 4 values) are utilized to determine a current pixel display value. Thus, the only pixel values that contribute to the current display value are 303 . . . 306.

Referring to FIG. 3D, an illustration of the averaging of pixel values once a dynamic event is no longer detected is provided. The example occurs at Frame 60, which is some number of frames from the start of a dynamic event. Because the dynamic event has completed, it is no longer necessary to drop the contributions of pixels in the EMA portion. Thus, as illustrated, the oldest pixel 360 is now part of the EMA portion when a new value (i.e., 364) is received. Referring to FIG. 3E, which illustrates the situation at Frame 61, the oldest pixel 361 (and previous oldest pixel 360) are utilized to calculate the EMA portion of the pixel value. While a dynamic event is no longer detected, the number of pixel values that contribute to the EMA portion, as illustrated in FIG. 3F. In this instance, all pixel values received since the conclusion of the dynamic event contribute to the EMA portion of the pixel value. Because of the exponential decay nature of an EMA algorithm, as a pixel value represents the pixel in the past, the contribution of the pixel to a new pixel value decreases to an eventual point of no longer affecting the new pixel value.

For illustration purposes only, the SMA portion of a pixel calculation is set to 4 frames and the EMA portion is represented by a portion that includes multiple values labeled "previous frames." However, any number of frames may be used for the SMA portion and the EMA portion may contain any number of values. For example, the SMA list may include more or fewer pixel values, with the EMA list including more or fewer values than as illustrated in FIGS. 3A to 3F.

Figure 4:
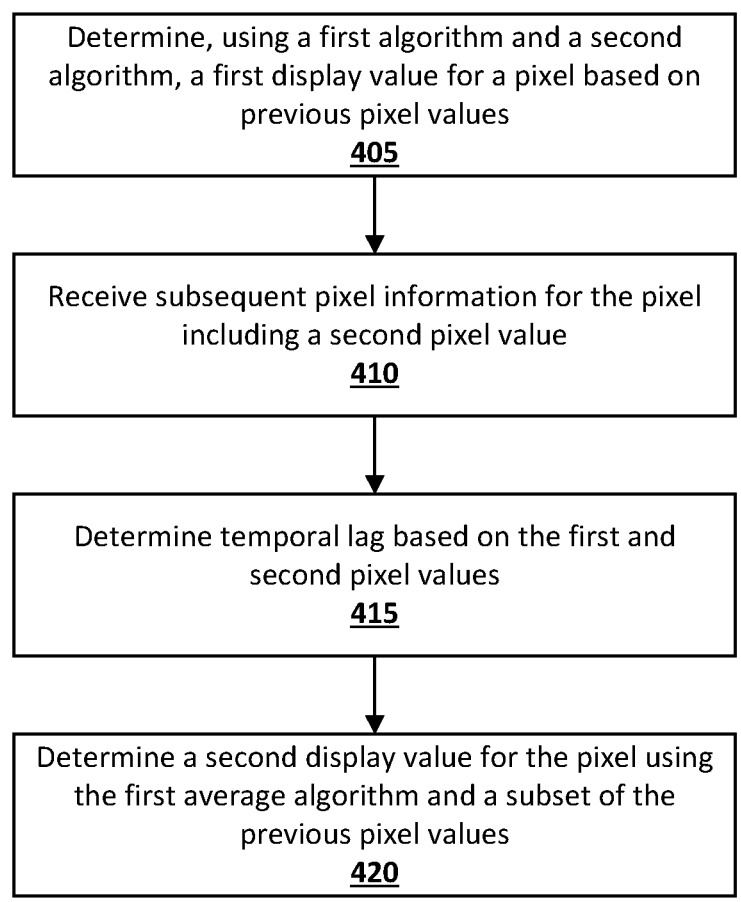
FIG. 4 illustrates a flowchart of one or more embodiments.

Referring to FIG. 4, a flowchart is provided illustrating an example embodiment as described herein. Some embodiments may have more or fewer steps, and/or may perform one or more steps in a different order. The method illustrated in FIG. 4 may be performed by an environment that shares one or more characteristics with environments illustrated and described herein.

At step 405, a first algorithm and a second algorithm are used to determine a pixel value by averaging a plurality of previous vales for the pixel. In some embodiments, the first algorithm may be a simple moving average and the second algorithm may be an exponential moving average (EMA). For example, a pixel display value may be determined based on an SMA window of values from previous frames, such as 4 previous values from the 4 previous frames. Referring to FIG. 2, a graph is provided that illustrates the contribution of each previous value of the pixel to the current display value of the pixel. By averaging the previous values to determine a current pixel value, the pixel display may be "smoothed" to reduce sudden changes in pixel values that may result in unnecessary blurriness.

At step 410, subsequent pixel information for the pixel is received that includes a second pixel value for the pixel. The subsequent pixel information may include the value for the pixel in a frame subsequent to the frame values that have already been utilized to determine a display pixel value. Thus, the new pixel value may be determined using the current value and an SMA/EMA average of some set of previous pixel values.

At 415, temporal lag is detected based on the first pixel value and the second pixel value. In this instance, the temporal lag may be detected based on one or more changes between the current pixel value and the recent pixel values (e.g., the value for the previous frame, two previous frames, or some other determination based on the current value and previous values). In some embodiments, the temporal lag may be determined based on detecting one or more events that is occurring over a series of frames. For example, one or more light sources may be rapidly moving between frames, resulting in one or more pixels rapidly changing from a lit region of an image to a shadowed region of the image. In those instances where the rapid change in a pixel value is required, "smoothing" the pixel value using more frames may result in the shadowing/unshadowing of a pixel to lag due to the contribution of the number of previous pixel values. Thus, when it is determined that temporal lag exists, an average for the pixel, that takes into account more recent values more than older pixel values, may improve lag.

At step 420, a second display value is determined for the pixel using the first average algorithm on a subset of the previous pixel values. In some embodiments, the algorithm utilized to determine the display pixel value once temporal lag has been determined may be an algorithm that is more computer resource intensive than the first averaging algorithm. For example, a simple moving average (SMA) may be utilized to determine the display value for a pixel while temporal lag has been detected. Any values or cumulative value representative of previous values that falls outside of the subset of previous pixel values is dropped from the averaging so that the first algorithm is used only on a set of most recent pixel values for the pixel of interest.

In some embodiments, the first averaging algorithm may be used for a first portion of the previous display values and the second averaging algorithm may be utilized for another portion of the previous display values. For example, values from a set of previous frames may be utilized using an SMA approach while older values may contribute to the display value using an EMA approach. Referring to again to FIG. 2, a 4-frame set of values is averaged using SMA with the older frames contributing to the average with EMA. The graph in FIG. 2 and the discussion of the frames as described with regards to FIGS. 3A-3F calculate the display value using SMA for the previous 4 frames and with EMA for the older frame values; however, any number of previous pixel values may be used to determine which portion of the previous frames will be averaged with the first algorithm and which frames will be averaged using the second algorithm.

In some embodiments, a new pixel value may be received that indicates that the temporal lag event has concluded. For example, a new pixel value may be received that differs from one or more previous pixel values by a threshold amount. Thus, because the pixel value has stabilized over one or more frames, a conclusion to the event may be inferred. In that instance, the averaging of the pixel value may be changed back to the hybrid approach of the first and second averaging algorithm, such as an SMA/EMA approach. Doing so reduces unnecessary resource expenditure in determining a pixel value by no longer using a SMA for a plurality of frames.

Figure 5A:
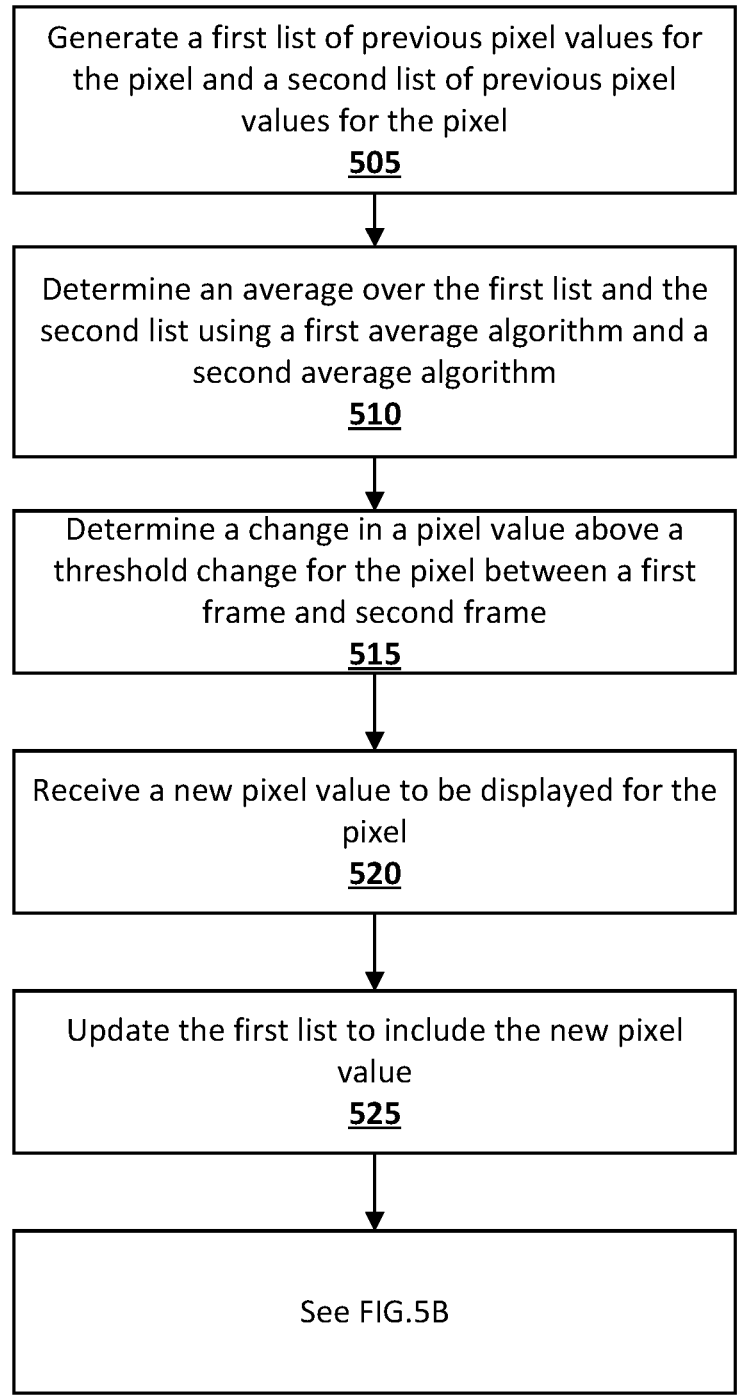
FIGS. 5A-5B illustrate a flowchart of one or more embodiments.
Figure 5B:
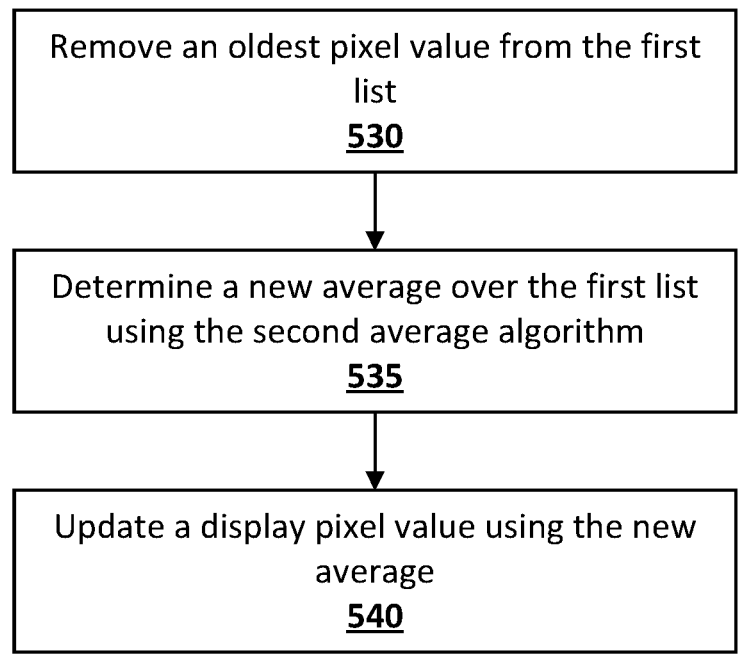

Referring to FIGS. 5A-5B, a flowchart is provided illustrating an example embodiment as described herein. Some embodiments may have more or fewer steps, and/or may perform one or more steps in a different order. The method illustrated in FIGS. 5A-5B may be performed by an environment that shares one or more characteristics with environments illustrated and described herein.

At step 505, a first list and a second list of previous pixel values for the pixel are generated. Referring again to FIG. 3A, two lists of pixel values are generated. The first list includes an SMA portion of previous values, 304 . . . 301. A second list of pixel values includes "previous frames." Although the first list is shown as having 4 values, and the second list is shown as having some values, either list may have any number of values. For example, the first list may include 5 values and the second list may be instead a single value calculated based on the contributions of previous frames, as previously described. Typically, the first list will have fewer values than the number of values in the second list that meaningfully contribute to current display value of the pixel. At step 510, a display pixel value is determined based on an SMA average of the first portion and an EMA average of a remainder of pixels values. In some instances, this EMA average may be a "running total" such that a single value is stored and updated as new values are received.

At step 515, a change in a pixel value between two frames is determined that exceeds a threshold value. For example, referring to FIG. 3A, a value 305 received for the frame may differ from value 304 by a threshold value such that temporal lag may be determined. In some embodiments, additional pixel values may be utilized to determine temporal lag that exceeds a threshold. For example, the threshold change in pixel value may take into account values 301, 302, and/or 303, to determine whether temporal lag exists such that a hybrid averaging approach may should be changed to an SMA-only approach.

At step 520, a new pixel value to be displayed for the pixel is received. Referring to FIG. 3C, new pixel value 306 is received and a display value for the pixel may be determined using one or more previous pixel values for the pixel. New pixel values may be received at a known or variable framerate, such as 60 frames per second. Further, the size of the first list may be determined based on the rate at which new values are received for a pixel.

At step 525, the first list is updated to include the new pixel value. Referring to FIG. 3B, the previous new value (i.e., 305) is added to the list. This is followed by the next value, 306, being added to the list when it is received, as illustrated in FIG. 3C. As previously described, the difference between the frames displayed in FIGS. 3B and 3C is that a dynamic event has been identified as occurring. Thus, as each new value is received, the most recent value is added to the SMA list. The SMA list continues to be updated with the newest value and, at step 530, an oldest pixel value from the first list is removed. For example, referring to FIG. 3C, value 301 and 302 are removed from the SMA list.

At step 535, a new display value for the pixel is determined using the first average algorithm (e.g., SMA) over only those values from the first list. The remainder of values, such as 301, 302, and one or more values indicative of "previous frames" are dropped from the averaging calculation. Thus, only the first 4 values from the most recent frames contribute to the display value of the pixel.

At step 540, a display value for the pixel is updated based on the new average. In some embodiments, once the display value is determined from the values in the first list and the second list, one or more components may cause the pixel to be displayed in a frame with the display value. The use of only the SMA-window for determining a pixel value may continue as new pixel values are received.

In some embodiments, once temporal lag, or a dynamic event, is no longer detected, the initial SMA/EMA hybrid approach may be reinstituted. For example, referring to FIG. 3D, the event has concluded at frame 60. Thus, the newest 4 values are still averaged using an SMA approach, but the oldest value (i.e., 360) is utilized to determine an EMA average (this is not necessary at this point since the average is for a single value). At FIG. 3E, the new value 365 is added to the SMA list and the oldest value in the SMA list (i.e., 361) is used, in conjunction with 360, to determine a new EMA average. Referring to FIG. 3F, this continues indefinitely with new values until a new dynamic event is detected.

Figure 6:
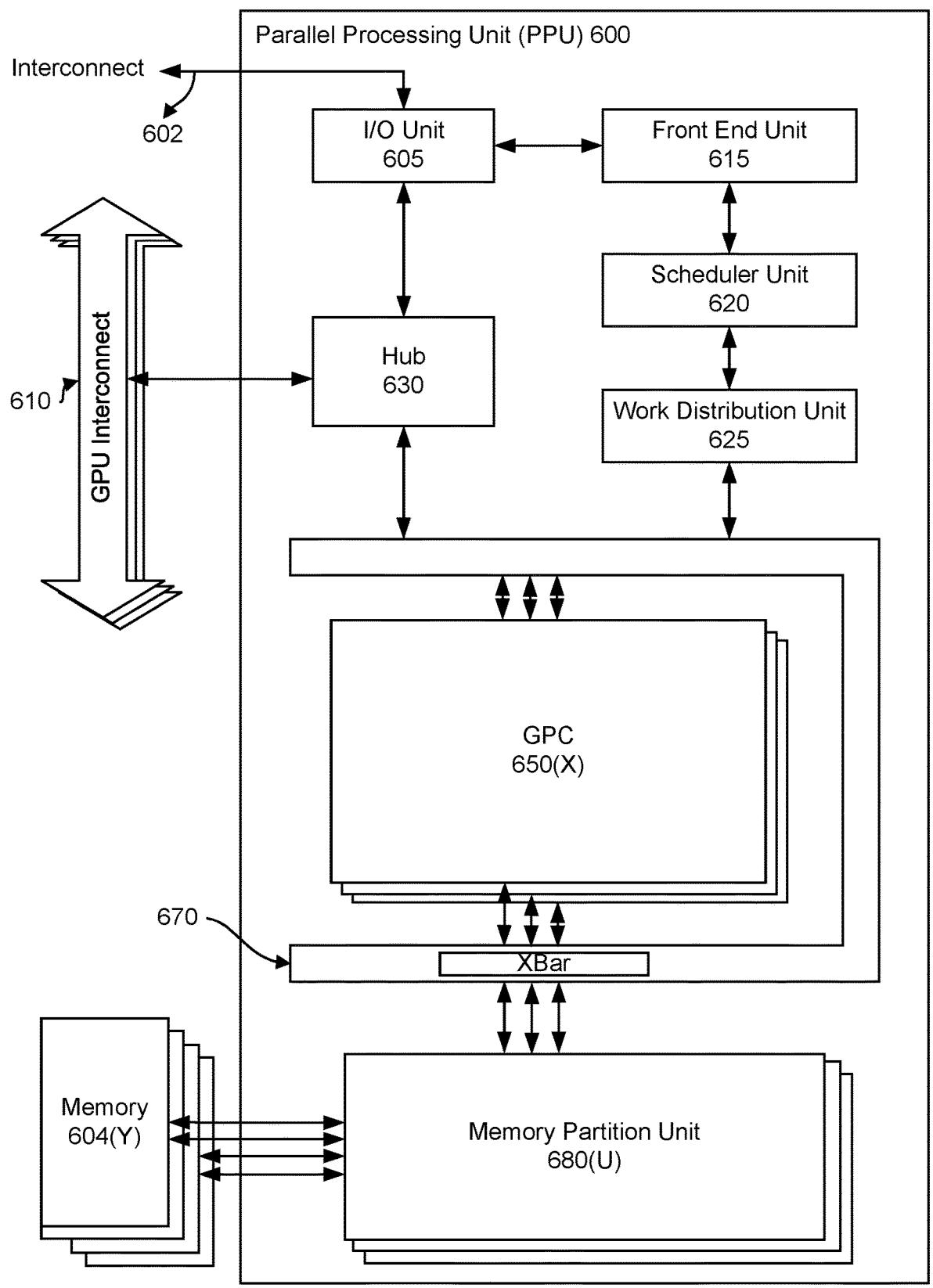
FIG. 6 illustrates a parallel processing unit, in accordance with an embodiment.

FIG. 6 illustrates a parallel processing unit (PPU) 600, in accordance with an embodiment. In an embodiment, the PPU 600 is a multi-threaded processor that is implemented on one or more integrated circuit devices. The PPU 600 is a latency hiding architecture designed to process many threads in parallel. A thread (i.e., a thread of execution) is an instantiation of a set of instructions configured to be executed by the PPU 600. In an embodiment, the PPU 600 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 600 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 600 may be configured to accelerate thousands of High Performance Computing (HPC), data center, and machine learning applications. The PPU 600 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 6, the PPU 600 includes an Input/Output (I/O) unit 605, a front end unit 615, a scheduler unit 620, a work distribution unit 625, a hub 630, a crossbar (XBar) 670, one or more general processing clusters (GPCs) 650, and one or more partition units 680. The PPU 600 may be connected to a host processor or other PPUs 600 via one or more high-speed NVLink 610 interconnect. The PPU 600 may be connected to a host processor or other peripheral devices via an interconnect 602. The PPU 600 may also be connected to a local memory comprising a number of memory devices 604. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 610 interconnect enables systems to scale and include one or more PPUs 600 combined with one or more CPUs, supports cache coherence between the PPUs 600 and CPUs, and CPU mastering. Data and/or commands may be transmitted by the NVLink 610 through the hub 630 to/from other units of the PPU 600 such as one or more copy engines, a video encoder, a video decoder, a power management unit, etc. (not explicitly shown). The NVLink 610 is described in more detail in conjunction with FIG. 8B.

The I/O unit 605 is configured to transmit and receive communications (i.e., commands, data, etc.) from a host processor (not shown) over the interconnect 602. The I/O unit 605 may communicate with the host processor directly via the interconnect 602 or through one or more intermediate devices such as a memory bridge. In an embodiment, the I/O unit 605 may communicate with one or more other processors, such as one or more the PPUs 600 via the interconnect 602. In an embodiment, the I/O unit 605 implements a Peripheral Component Interconnect Express (PCIe) interface for communications over a PCIe bus and the interconnect 602 is a PCIe bus. In alternative embodiments, the I/O unit 605 may implement other types of well-known interfaces for communicating with external devices.

The I/O unit 605 decodes packets received via the interconnect 602. In an embodiment, the packets represent commands configured to cause the PPU 600 to perform various operations. The I/O unit 605 transmits the decoded commands to various other units of the PPU 600 as the commands may specify. For example, some commands may be transmitted to the front end unit 615. Other commands may be transmitted to the hub 630 or other units of the PPU 600 such as one or more copy engines, a video encoder, a video decoder, a power management unit, etc. (not explicitly shown). In other words, the I/O unit 605 is configured to route communications between and among the various logical units of the PPU 600.

In an embodiment, a program executed by the host processor encodes a command stream in a buffer that provides workloads to the PPU 600 for processing. A workload may comprise several instructions and data to be processed by those instructions. The buffer is a region in a memory that is accessible (i.e., read/write) by both the host processor and the PPU 600. For example, the I/O unit 605 may be configured to access the buffer in a system memory connected to the interconnect 602 via memory requests transmitted over the interconnect 602. In an embodiment, the host processor writes the command stream to the buffer and then transmits a pointer to the start of the command stream to the PPU 600. The front end unit 615 receives pointers to one or more command streams. The front end unit 615 manages the one or more streams, reading commands from the streams and forwarding commands to the various units of the PPU 600.

The front end unit 615 is coupled to a scheduler unit 620 that configures the various GPCs 650 to process tasks defined by the one or more streams. The scheduler unit 620 is configured to track state information related to the various tasks managed by the scheduler unit 620. The state may indicate which GPC 650 a task is assigned to, whether the task is active or inactive, a priority level associated with the task, and so forth. The scheduler unit 620 manages the execution of a plurality of tasks on the one or more GPCs 650.

The scheduler unit 620 is coupled to a work distribution unit 625 that is configured to dispatch tasks for execution on the GPCs 650. The work distribution unit 625 may track a number of scheduled tasks received from the scheduler unit 620. In an embodiment, the work distribution unit 625 manages a pending task pool and an active task pool for each of the GPCs 650. The pending task pool may comprise a number of slots (e.g., 32 slots) that contain tasks assigned to be processed by a particular GPC 650. The active task pool may comprise a number of slots (e.g., 4 slots) for tasks that are actively being processed by the GPCs 650. As a GPC 650 finishes the execution of a task, that task is evicted from the active task pool for the GPC 650 and one of the other tasks from the pending task pool is selected and scheduled for execution on the GPC 650. If an active task has been idle on the GPC 650, such as while waiting for a data dependency to be resolved, then the active task may be evicted from the GPC 650 and returned to the pending task pool while another task in the pending task pool is selected and scheduled for execution on the GPC 650.

The work distribution unit 625 communicates with the one or more GPCs 650 via XBar 670. The XBar 670 is an interconnect network that couples many of the units of the PPU 600 to other units of the PPU 600. For example, the XBar 670 may be configured to couple the work distribution unit 625 to a particular GPC 650. Although not shown explicitly, one or more other units of the PPU 600 may also be connected to the XBar 670 via the hub 630.

The tasks are managed by the scheduler unit 620 and dispatched to a GPC 650 by the work distribution unit 625. The GPC 650 is configured to process the task and generate results. The results may be consumed by other tasks within the GPC 650, routed to a different GPC 650 via the XBar 670, or stored in the memory 604. The results can be written to the memory 604 via the partition units 680, which implement a memory interface for reading and writing data to/from the memory 604. The results can be transmitted to another PPU 600 or CPU via the NVLink 610. In an embodiment, the PPU 600 includes a number U of partition units 680 that is equal to the number of separate and distinct memory devices 604 coupled to the PPU 600. A partition unit 680 will be described in more detail below in conjunction with FIG. 7B.

In an embodiment, a host processor executes a driver kernel that implements an application programming interface (API) that enables one or more applications executing on the host processor to schedule operations for execution on the PPU 600. In an embodiment, multiple compute applications are simultaneously executed by the PPU 600 and the PPU 600 provides isolation, quality of service (QoS), and independent address spaces for the multiple compute applications. An application may generate instructions (i.e., API calls) that cause the driver kernel to generate one or more tasks for execution by the PPU 600. The driver kernel outputs tasks to one or more streams being processed by the PPU 600. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 8A.

Figure 7A:
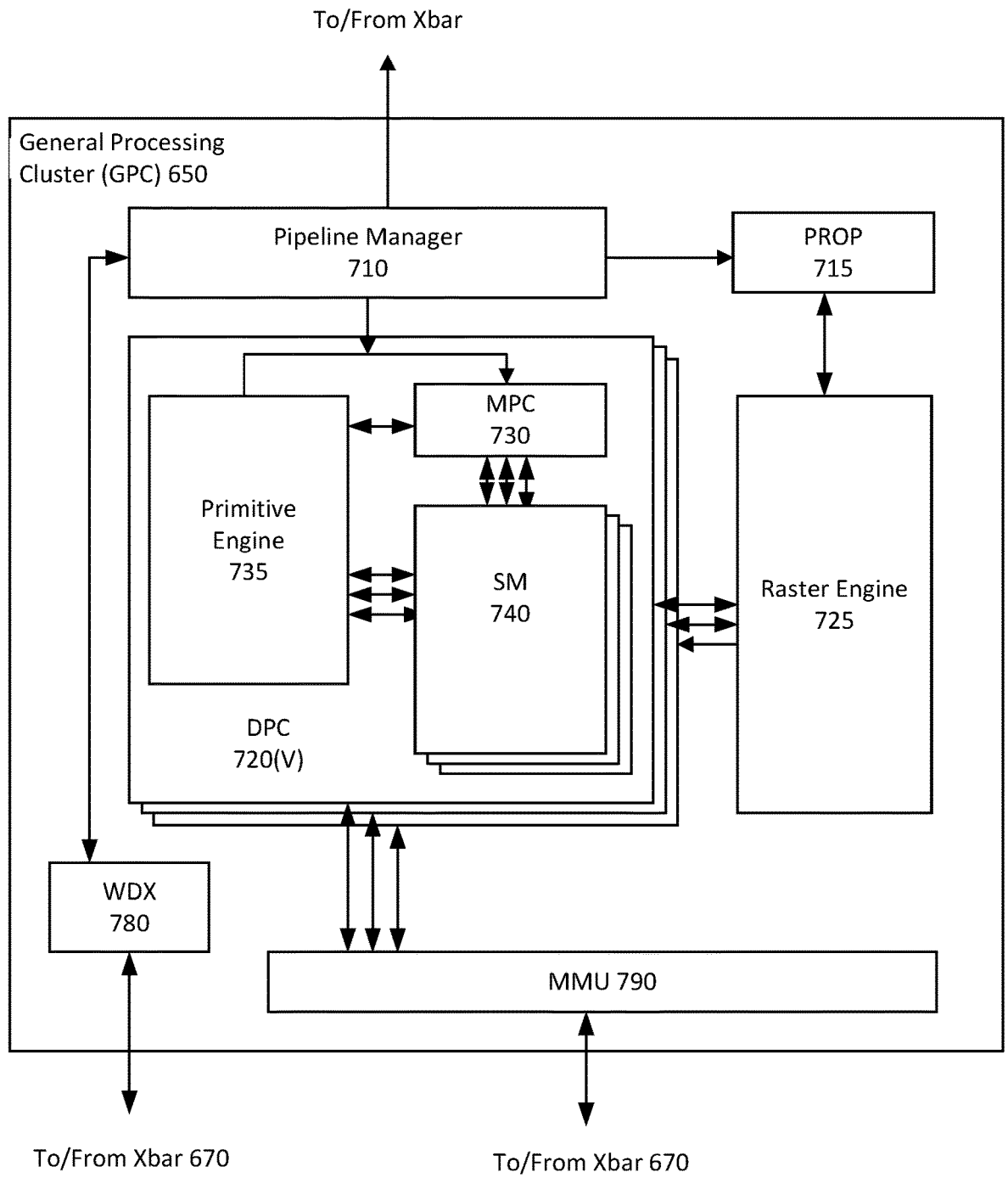
FIG. 7A illustrates a general processing cluster within the parallel processing unit of FIG. 6, in accordance with an embodiment.

FIG. 7A illustrates a GPC 650 of the PPU 600 of FIG. 6, in accordance with an embodiment. As shown in FIG. 7A, each GPC 650 includes a number of hardware units for processing tasks. In an embodiment, each GPC 650 includes a pipeline manager 710, a pre-raster operations unit (PROP) 715, a raster engine 725, a work distribution crossbar (WDX) 780, a memory management unit (MMU) 790, and one or more Data Processing Clusters (DPCs) 720. It will be appreciated that the GPC 650 of FIG. 7A may include other hardware units in lieu of or in addition to the units shown in FIG. 7A.

In an embodiment, the operation of the GPC 650 is controlled by the pipeline manager 710. The pipeline manager 710 manages the configuration of the one or more DPCs 720 for processing tasks allocated to the GPC 650. In an embodiment, the pipeline manager 710 may configure at least one of the one or more DPCs 720 to implement at least a portion of a graphics rendering pipeline. For example, a DPC 720 may be configured to execute a vertex shader program on the programmable streaming multiprocessor (SM) 740. The pipeline manager 710 may also be configured to route packets received from the work distribution unit 625 to the appropriate logical units within the GPC 650. For example, some packets may be routed to fixed function hardware units in the PROP 715 and/or raster engine 725 while other packets may be routed to the DPCs 720 for processing by the primitive engine 735 or the SM 740. In an embodiment, the pipeline manager 710 may configure at least one of the one or more DPCs 720 to implement a neural network model and/or a computing pipeline.

Figure 7B:
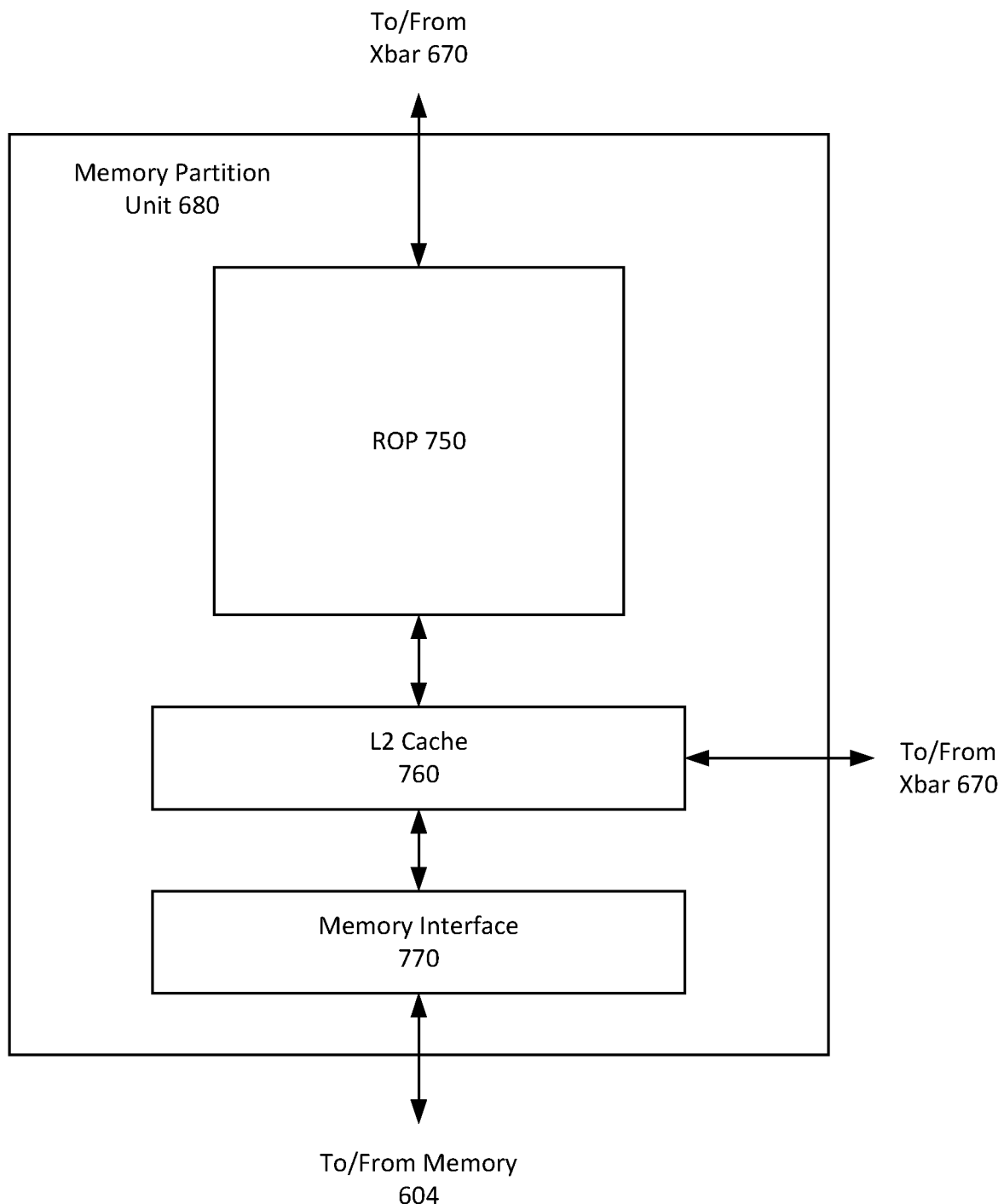
FIG. 7B illustrates a memory partition unit of the parallel processing unit of FIG. 6, in accordance with an embodiment.

The PROP unit 715 is configured to route data generated by the raster engine 725 and the DPCs 720 to a Raster Operations (ROP) unit, described in more detail in conjunction with FIG. 7B. The PROP unit 715 may also be configured to perform optimizations for color blending, organize pixel data, perform address translations, and the like.

The raster engine 725 includes a number of fixed function hardware units configured to perform various raster operations. In an embodiment, the raster engine 725 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 725 comprises fragments to be processed, for example, by a fragment shader implemented within a DPC 720.

Each DPC 720 included in the GPC 650 includes an M-Pipe Controller (MPC) 730, a primitive engine 735, and one or more SMs 740. The MPC 730 controls the operation of the DPC 720, routing packets received from the pipeline manager 710 to the appropriate units in the DPC 720. For example, packets associated with a vertex may be routed to the primitive engine 735, which is configured to fetch vertex attributes associated with the vertex from the memory 604. In contrast, packets associated with a shader program may be transmitted to the SM 740.

The SM 740 comprises a programmable streaming processor that is configured to process tasks represented by a number of threads. Each SM 740 is multi-threaded and configured to execute a plurality of threads (e.g., 32 threads) from a particular group of threads concurrently. In an embodiment, the SM 740 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 740 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The SM 740 will be described in more detail below in conjunction with FIG. 8A.

The MMU 790 provides an interface between the GPC 650 and the partition unit 680. The MMU 790 may provide translation of virtual addresses into physical addresses, memory protection, and arbitration of memory requests. In an embodiment, the MMU 790 provides one or more translation lookaside buffers (TLBs) for performing translation of virtual addresses into physical addresses in the memory 604.

FIG. 7B illustrates a memory partition unit 680 of the PPU 600 of FIG. 6, in accordance with an embodiment. As shown in FIG. 7B, the memory partition unit 680 includes a Raster Operations (ROP) unit 750, a level two (L2) cache 760, and a memory interface 770. The memory interface 770 is coupled to the memory 604. Memory interface 770 may implement 32, 64, 128, 1024-bit data buses, or the like, for high-speed data transfer. In an embodiment, the PPU 600 incorporates U memory interfaces 770, one memory interface 770 per pair of partition units 680, where each pair of partition units 680 is connected to a corresponding memory device 604. For example, PPU 600 may be connected to up to Y memory devices 604, such as high bandwidth memory stacks or graphics double-data-rate, version 5, synchronous dynamic random access memory, or other types of persistent storage.

In an embodiment, the memory interface 770 implements an HBM2 memory interface and Y equals half U. In an embodiment, the HBM2 memory stacks are located on the same physical package as the PPU 600, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 604 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 600 process very large datasets and/or run applications for extended periods.

In an embodiment, the PPU 600 implements a multi-level memory hierarchy. In an embodiment, the memory partition unit 680 supports a unified memory to provide a single unified virtual address space for CPU and PPU 600 memory, enabling data sharing between virtual memory systems. In an embodiment the frequency of accesses by a PPU 600 to memory located on other processors is traced to ensure that memory pages are moved to the physical memory of the PPU 600 that is accessing the pages more frequently. In an embodiment, the NVLink 610 supports address translation services allowing the PPU 600 to directly access a CPU's page tables and providing full access to CPU memory by the PPU 600.

In an embodiment, copy engines transfer data between multiple PPUs 600 or between PPUs 600 and CPUs. The copy engines can generate page faults for addresses that are not mapped into the page tables. The memory partition unit 680 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 604 or other system memory may be fetched by the memory partition unit 680 and stored in the L2 cache 760, which is located on-chip and is shared between the various GPCs 650. As shown, each memory partition unit 680 includes a portion of the L2 cache 760 associated with a corresponding memory device 604. Lower level caches may then be implemented in various units within the GPCs 650. For example, each of the SMs 740 may implement a level one (L1) cache. The L1 cache is private memory that is dedicated to a particular SM 740. Data from the L2 cache 760 may be fetched and stored in each of the L1 caches for processing in the functional units of the SMs 740. The L2 cache 760 is coupled to the memory interface 770 and the XBar 670.

The ROP unit 750 performs graphics raster operations related to pixel color, such as color compression, pixel blending, and the like. The ROP unit 750 also implements depth testing in conjunction with the raster engine 725, receiving a depth for a sample location associated with a pixel fragment from the culling engine of the raster engine 725. The depth is tested against a corresponding depth in a depth buffer for a sample location associated with the fragment. If the fragment passes the depth test for the sample location, then the ROP unit 750 updates the depth buffer and transmits a result of the depth test to the raster engine 725. It will be appreciated that the number of partition units 280 may be different than the number of GPCs 650 and, therefore, each ROP unit 750 may be coupled to each of the GPCs 650. The ROP unit 750 tracks packets received from the different GPCs 650 and determines which GPC 650 that a result generated by the ROP unit 750 is routed to through the Xbar 670. Although the ROP unit 750 is included within the memory partition unit 680 in FIG. 7B, in other embodiment, the ROP unit 750 may be outside of the memory partition unit 680. For example, the ROP unit 750 may reside in the GPC 650 or another unit.

Figure 8A:
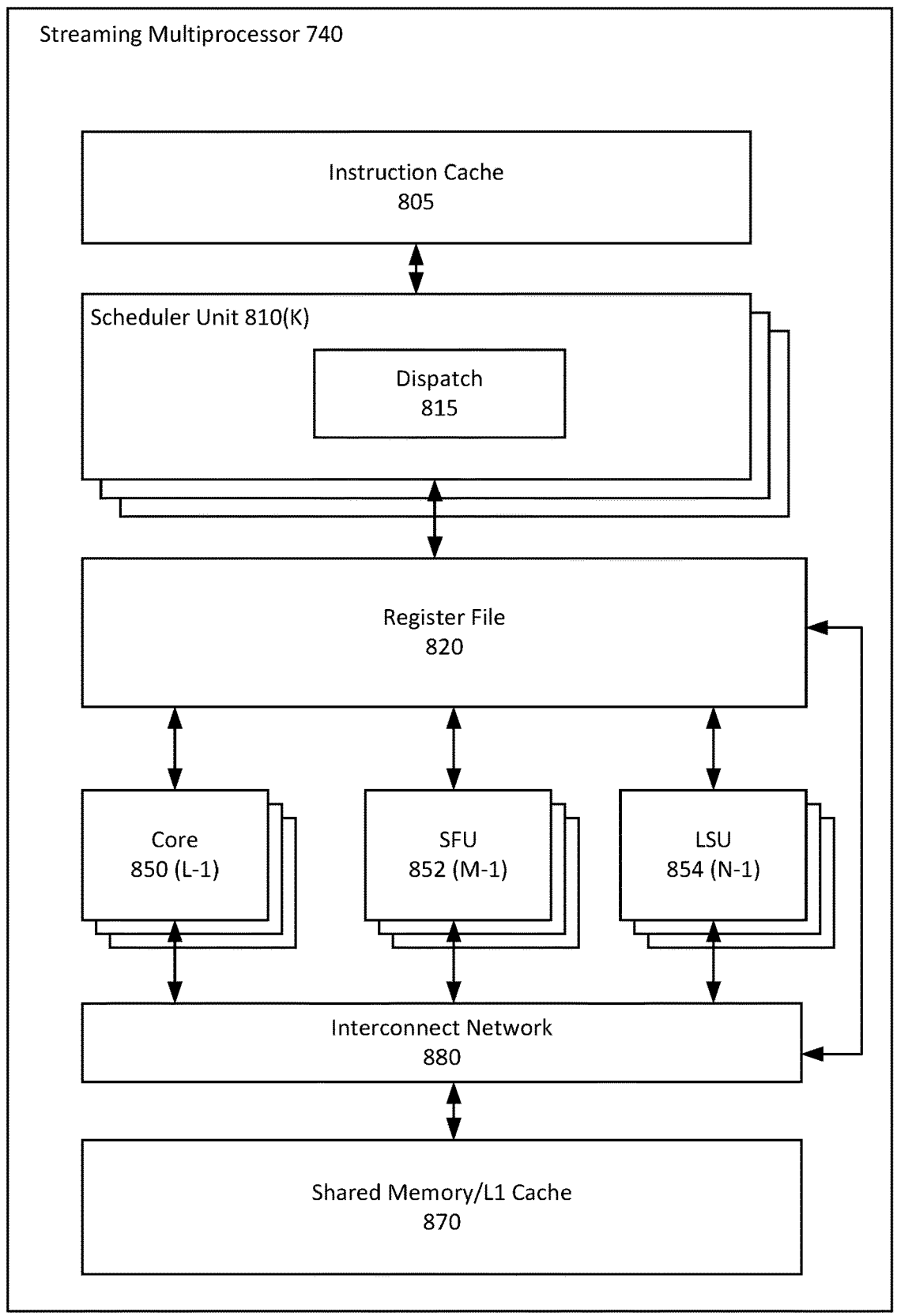
FIG. 8A illustrates the streaming multi-processor of FIG. 7A, in accordance with an embodiment.

FIG. 8A illustrates the streaming multi-processor 740 of FIG. 7A, in accordance with an embodiment. As shown in FIG. 8A, the SM 740 includes an instruction cache 805, one or more scheduler units 810(K), a register file 820, one or more processing cores 850, one or more special function units (SFUs) 852, one or more load/store units (LSUs) 854, an interconnect network 880, a shared memory/L1 cache 870.

As described above, the work distribution unit 625 dispatches tasks for execution on the GPCs 650 of the PPU 600. The tasks are allocated to a particular DPC 720 within a GPC 650 and, if the task is associated with a shader program, the task may be allocated to an SM 740. The scheduler unit 810(K) receives the tasks from the work distribution unit 625 and manages instruction scheduling for one or more thread blocks assigned to the SM 740. The scheduler unit 810(K) schedules thread blocks for execution as warps of parallel threads, where each thread block is allocated at least one warp. In an embodiment, each warp executes 32 threads. The scheduler unit 810(K) may manage a plurality of different thread blocks, allocating the warps to the different thread blocks and then dispatching instructions from the plurality of different cooperative groups to the various functional units (i.e., cores 850, SFUs 852, and LSUs 854) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 815 is configured to transmit instructions to one or more of the functional units. In the embodiment, the scheduler unit 810(K) includes two dispatch units 815 that enable two different instructions from the same warp to be dispatched during each clock cycle. In alternative embodiments, each scheduler unit 810(K) may include a single dispatch unit 815 or additional dispatch units 815.

Each SM 740 includes a register file 820 that provides a set of registers for the functional units of the SM 740. In an embodiment, the register file 820 is divided between each of the functional units such that each functional unit is allocated a dedicated portion of the register file 820. In another embodiment, the register file 820 is divided between the different warps being executed by the SM 740. The register file 820 provides temporary storage for operands connected to the data paths of the functional units.

Each SM 740 comprises L processing cores 850. In an embodiment, the SM 740 includes a large number (e.g., 128, etc.) of distinct processing cores 850. Each core 850 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 850 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 850. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A+B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 740 also comprises M SFUs 852 that perform special functions (e.g., attribute evaluation, reciprocal square root, and the like). In an embodiment, the SFUs 852 may include a tree traversal unit configured to traverse a hierarchical tree data structure. In an embodiment, the SFUs 852 may include texture unit configured to perform texture map filtering operations. In an embodiment, the texture units are configured to load texture maps (e.g., a 2D array of texels) from the memory 604 and sample the texture maps to produce sampled texture values for use in shader programs executed by the SM 740. In an embodiment, the texture maps are stored in the shared memory/L1 cache 370. The texture units implement texture operations such as filtering operations using mip-maps (i.e., texture maps of varying levels of detail). In an embodiment, each SM 640 includes two texture units.

Each SM 740 also comprises N LSUs 854 that implement load and store operations between the shared memory/L1 cache 870 and the register file 820. Each SM 740 includes an interconnect network 880 that connects each of the functional units to the register file 820 and the LSU 854 to the register file 820, shared memory/L1 cache 870. In an embodiment, the interconnect network 880 is a crossbar that can be configured to connect any of the functional units to any of the registers in the register file 820 and connect the LSUs 854 to the register file and memory locations in shared memory/L1 cache 870.

The shared memory/L1 cache 870 is an array of on-chip memory that allows for data storage and communication between the SM 740 and the primitive engine 735 and between threads in the SM 740. In an embodiment, the shared memory/L1 cache 870 comprises 128 KB of storage capacity and is in the path from the SM 740 to the partition unit 680. The shared memory/L1 cache 870 can be used to cache reads and writes. One or more of the shared memory/L1 cache 870, L2 cache 760, and memory 604 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 870 enables the shared memory/L1 cache 870 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 6, are bypassed, creating a much simpler programming model. In the general purpose parallel computation configuration, the work distribution unit 625 assigns and distributes blocks of threads directly to the DPCs 720. The threads in a block execute the same program, using a unique thread ID in the calculation to ensure each thread generates unique results, using the SM 740 to execute the program and perform calculations, shared memory/L1 cache 870 to communicate between threads, and the LSU 854 to read and write global memory through the shared memory/L1 cache 870 and the memory partition unit 680. When configured for general purpose parallel computation, the SM 740 can also write commands that the scheduler unit 620 can use to launch new work on the DPCs 720.

The PPU 600 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 600 is embodied on a single semiconductor substrate. In another embodiment, the PPU 600 is included in a system-on-a-chip (SoC) along with one or more other devices such as additional PPUs 600, the memory 604, a reduced instruction set computer (RISC) CPU, a memory management unit (MMU), a digital-to-analog converter (DAC), and the like.

In an embodiment, the PPU 600 may be included on a graphics card that includes one or more memory devices 604. The graphics card may be configured to interface with a PCIe slot on a motherboard of a desktop computer. In yet another embodiment, the PPU 600 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 8B:
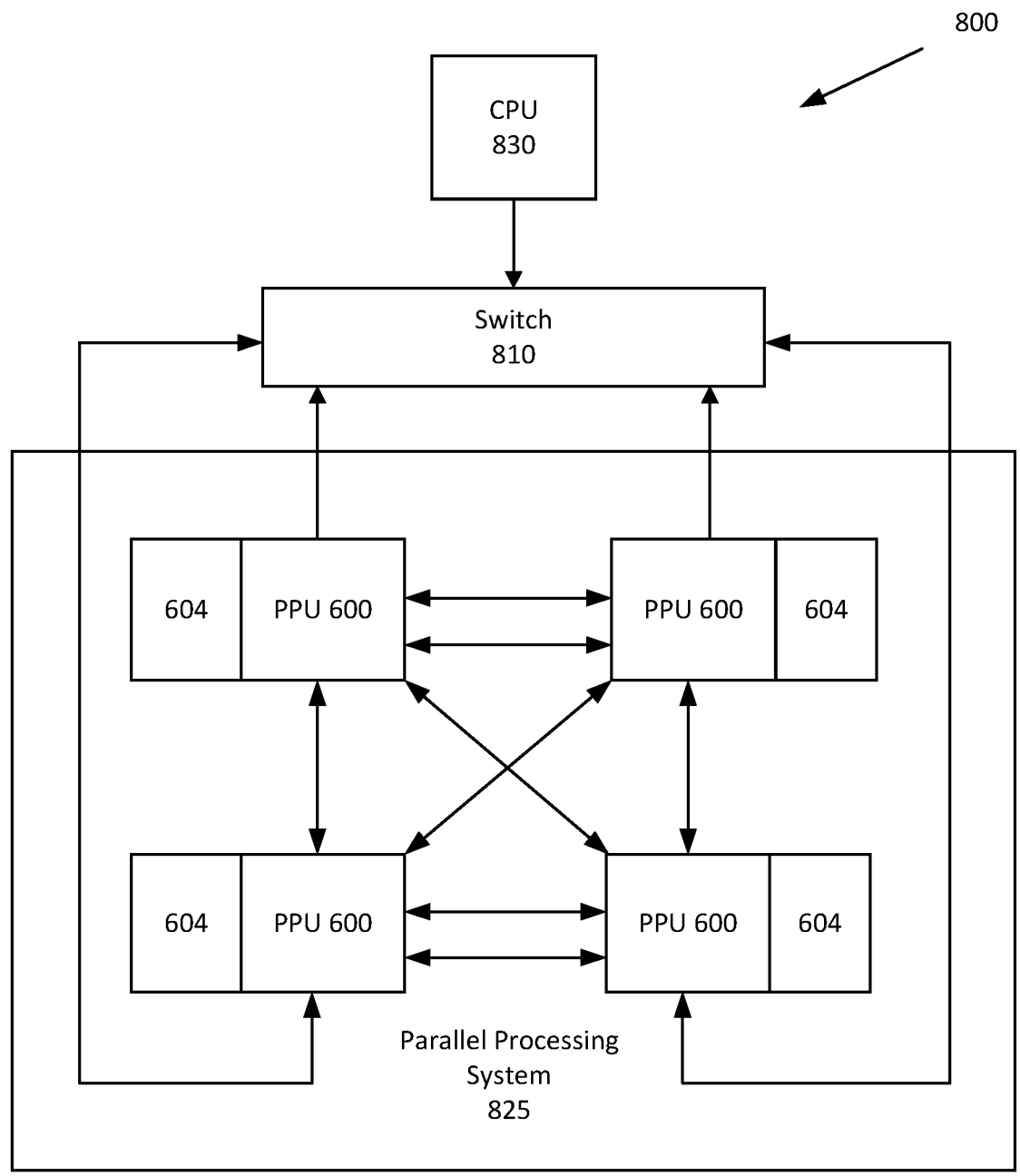
FIG. 8B is a conceptual diagram of a processing system implemented using the PPU of FIG. 6, in accordance with an embodiment.

FIG. 8B is a conceptual diagram of a processing system 800 implemented using the PPU 600 of FIG. 6, in accordance with an embodiment. The exemplary system 865 may be configured to implement the methods shown in FIGS. 3-5 and discussed further below. The processing system 800 includes a CPU 830, switch 810, and multiple PPUs 600 each and respective memories 604. The NVLink 610 provides high-speed communication links between each of the PPUs 600. Although a particular number of NVLink 610 and interconnect 602 connections are illustrated in FIG. 8B, the number of connections to each PPU 600 and the CPU 830 may vary. The switch 810 interfaces between the interconnect 602 and the CPU 830. The PPUs 600, memories 604, and NVLinks 610 may be situated on a single semiconductor platform to form a parallel processing module 825. In an embodiment, the switch 810 supports two or more protocols to interface between various different connections and/or links.

In another embodiment (not shown), the NVLink 610 provides one or more high-speed communication links between each of the PPUs 600 and the CPU 830 and the switch 810 interfaces between the interconnect 602 and each of the PPUs 600. The PPUs 600, memories 604, and interconnect 602 may be situated on a single semiconductor platform to form a parallel processing module 825. In yet another embodiment (not shown), the interconnect 602 provides one or more communication links between each of the PPUs 600 and the CPU 830 and the switch 810 interfaces between each of the PPUs 600 using the NVLink 610 to provide one or more high-speed communication links between the PPUs 600. In another embodiment (not shown), the NVLink 610 provides one or more high-speed communication links between the PPUs 600 and the CPU 830 through the switch 810. In yet another embodiment (not shown), the interconnect 602 provides one or more communication links between each of the PPUs 600 directly. One or more of the NVLink 610 high-speed communication links may be implemented as a physical NVLink interconnect or either an on-chip or on-die interconnect using the same protocol as the NVLink 610.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 825 may be implemented as a circuit board substrate and each of the PPUs 600 and/or memories 604 may be packaged devices. In an embodiment, the CPU 830, switch 810, and the parallel processing module 825 are situated on a single semiconductor platform.

In an embodiment, the signaling rate of each NVLink 610 is 20 to 25 Gigabits/second and each PPU 600 includes six NVLink 610 interfaces (as shown in FIG. 8B, five NVLink 610 interfaces are included for each PPU 600). Each NVLink 610 provides a data transfer rate of 25 Gigabytes/second in each direction, with six links providing 300 Gigabytes/second. The NVLinks 610 can be used exclusively for PPU-to-PPU communication as shown in FIG. 8B, or some combination of PPU-to-PPU and PPU-to-CPU, when the CPU 830 also includes one or more NVLink 610 interfaces.

In an embodiment, the NVLink 610 allows direct load/store/atomic access from the CPU 830 to each PPU's 600 memory 604. In an embodiment, the NVLink 610 supports coherency operations, allowing data read from the memories 604 to be stored in the cache hierarchy of the CPU 830, reducing cache access latency for the CPU 830. In an embodiment, the NVLink 610 includes support for Address Translation Services (ATS), allowing the PPU 600 to directly access page tables within the CPU 830. One or more of the NVLinks 610 may also be configured to operate in a low-power mode.

Figure 8C:
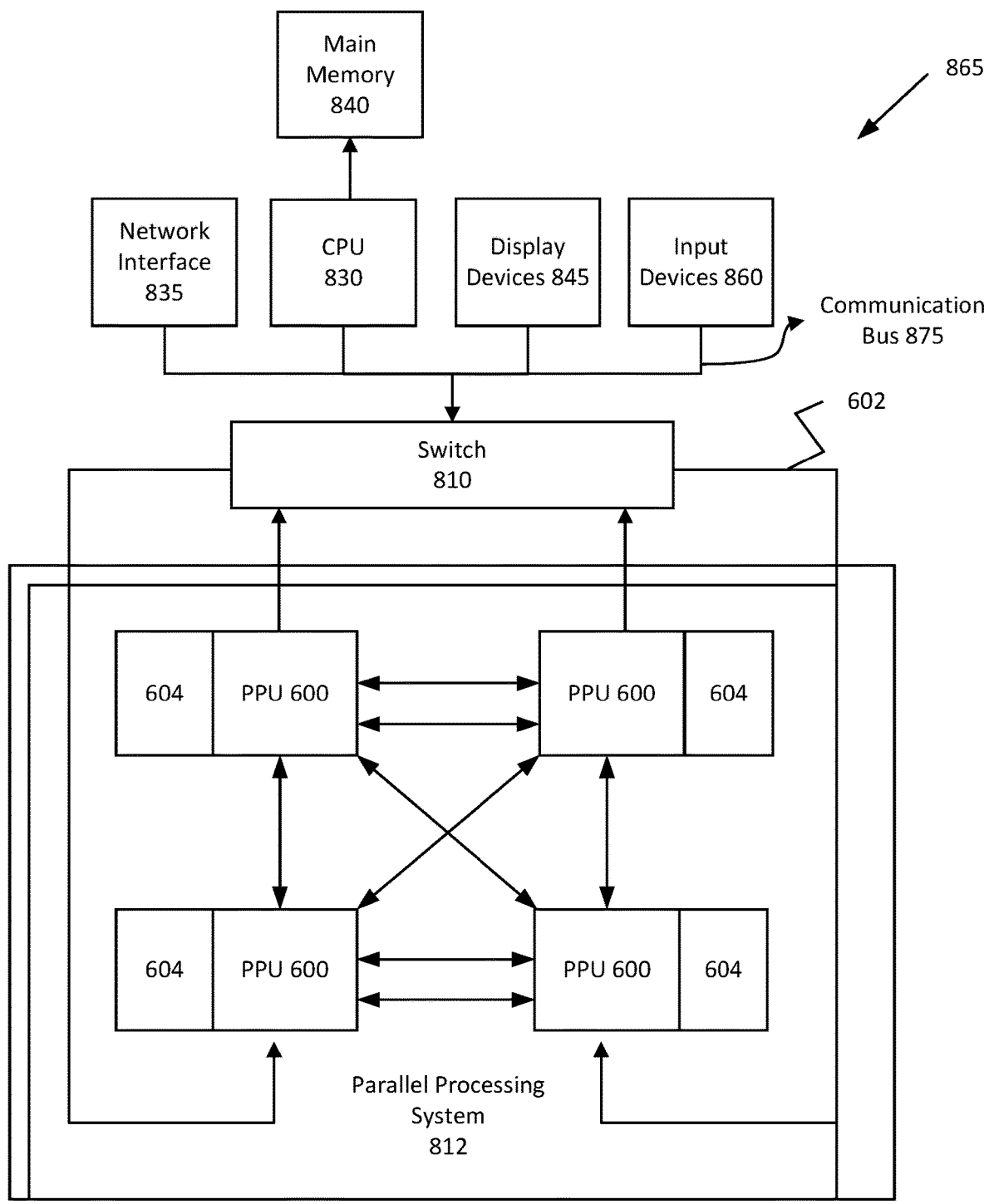
FIG. 8C illustrates an exemplary system in which the various architecture and/or functionality of the various previous embodiments may be implemented.

FIG. 8C illustrates an exemplary system 865 in which the various architecture and/or functionality of the various previous embodiments may be implemented. The exemplary system 865 may be configured to implement the method 200 shown in FIG. 2.

As shown, a system 865 is provided including at least one central processing unit 830 that is connected to a communication bus 875. The communication bus 875 may be implemented using any suitable protocol, such as PCI (Peripheral Component Interconnect), PCI-Express, AGP (Accelerated Graphics Port), HyperTransport, or any other bus or point-to-point communication protocol(s). The system 865 also includes a main memory 840. Control logic (software) and data are stored in the main memory 840 which may take the form of random access memory (RAM).

The system 865 also includes input devices 860, the parallel processing system 825, and display devices 845, i.e., a conventional CRT (cathode ray tube), LCD (liquid crystal display), LED (light emitting diode), plasma display or the like. User input may be received from the input devices 860, e.g., keyboard, mouse, touchpad, microphone, and the like. Each of the foregoing modules and/or devices may even be situated on a single semiconductor platform to form the system 865. Alternately, the various modules may also be situated separately or in various combinations of semiconductor platforms per the desires of the user.

Further, the system 865 may be coupled to a network (e.g., a telecommunications network, local area network (LAN), wireless network, wide area network (WAN) such as the Internet, peer-to-peer network, cable network, or the like) through a network interface 835 for communication purposes.

The system 865 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 840 and/or the secondary storage. Such computer programs, when executed, enable the system 865 to perform various functions. The memory 840, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 865 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

In an embodiment, the PPU 600 comprises a graphics processing unit (GPU). The PPU 600 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 600 can be configured to process the graphics primitives to generate a frame buffer (i.e., pixel data for each of the pixels of the display).

An application writes model data for a scene (i.e., a collection of vertices and attributes) to a memory such as a system memory or memory 604. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 740 of the PPU 600 including one or more of a vertex shader, hull shader, domain shader, geometry shader, and a pixel shader. For example, one or more of the SMs 740 may be configured to execute a vertex shader program that processes a number of vertices defined by the model data. In an embodiment, the different SMs 740 may be configured to execute different shader programs concurrently. For example, a first subset of SMs 740 may be configured to execute a vertex shader program while a second subset of SMs 740 may be configured to execute a pixel shader program. The first subset of SMs 740 processes vertex data to produce processed vertex data and writes the processed vertex data to the L2 cache 760 and/or the memory 604. After the processed vertex data is rasterized (i.e., transformed from three-dimensional data into two-dimensional data in screen space) to produce fragment data, the second subset of SMs 740 executes a pixel shader to produce processed fragment data, which is then blended with other processed fragment data and written to the frame buffer in memory 604. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 9:
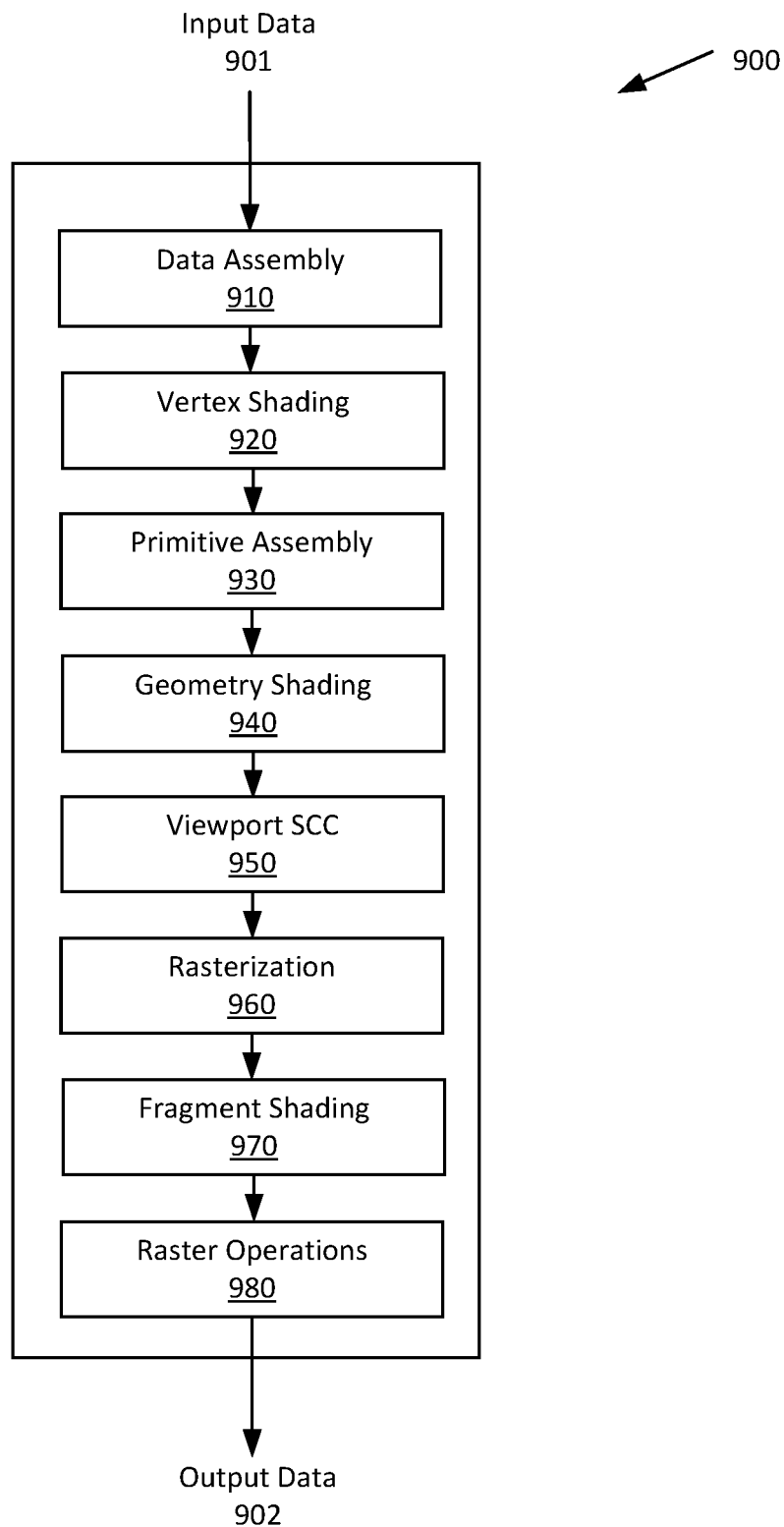
FIG. 9 is a conceptual diagram of a graphics processing pipeline implemented by the PPU of FIG. 6, in accordance with an embodiment.

FIG. 9 is a conceptual diagram of a graphics processing pipeline 900 implemented by the PPU 600 of FIG. 6, in accordance with an embodiment. The graphics processing pipeline 900 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 900 receives input data 901 that is transmitted from one stage to the next stage of the graphics processing pipeline 900 to generate output data 902. In an embodiment, the graphics processing pipeline 900 may represent a graphics processing pipeline defined by the OpenGL® API. As an option, the graphics processing pipeline 900 may be implemented in the context of the functionality and architecture of the previous Figures and/or any subsequent Figure(s).

As shown in FIG. 9, the graphics processing pipeline 900 comprises a pipeline architecture that includes a number of stages. The stages include, but are not limited to, a data assembly stage 910, a vertex shading stage 920, a primitive assembly stage 930, a geometry shading stage 940, a viewport scale, cull, and clip (VSCC) stage 950, a rasterization stage 960, a fragment shading stage 970, and a raster operations stage 980. In an embodiment, the input data 901 comprises commands that configure the processing units to implement the stages of the graphics processing pipeline 900 and geometric primitives (e.g., points, lines, triangles, quads, triangle strips or fans, etc.) to be processed by the stages. The output data 902 may comprise pixel data (i.e., color data) that is copied into a frame buffer or other type of surface data structure in a memory.

The data assembly stage 910 receives the input data 901 that specifies vertex data for high-order surfaces, primitives, or the like. The data assembly stage 910 collects the vertex data in a temporary storage or queue, such as by receiving a command from the host processor that includes a pointer to a buffer in memory and reading the vertex data from the buffer. The vertex data is then transmitted to the vertex shading stage 920 for processing.

The vertex shading stage 920 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 920 may manipulate individual vertex attributes such as position, color, texture coordinates, and the like. In other words, the vertex shading stage 920 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 920 generates transformed vertex data that is transmitted to the primitive assembly stage 930.

The primitive assembly stage 930 collects vertices output by the vertex shading stage 920 and groups the vertices into geometric primitives for processing by the geometry shading stage 940. For example, the primitive assembly stage 930 may be configured to group every three consecutive vertices as a geometric primitive (i.e., a triangle) for transmission to the geometry shading stage 940. In some embodiments, specific vertices may be reused for consecutive geometric primitives (e.g., two consecutive triangles in a triangle strip may share two vertices). The primitive assembly stage 930 transmits geometric primitives (i.e., a collection of associated vertices) to the geometry shading stage 940.

The geometry shading stage 940 processes geometric primitives by performing a set of operations (i.e., a geometry shader or program) on the geometric primitives. Tessellation operations may generate one or more geometric primitives from each geometric primitive. In other words, the geometry shading stage 940 may subdivide each geometric primitive into a finer mesh of two or more geometric primitives for processing by the rest of the graphics processing pipeline 900. The geometry shading stage 940 transmits geometric primitives to the viewport SCC stage 950.

In an embodiment, the graphics processing pipeline 900 may operate within a streaming multiprocessor and the vertex shading stage 920, the primitive assembly stage 930, the geometry shading stage 940, the fragment shading stage 970, and/or hardware/software associated therewith, may sequentially perform processing operations. Once the sequential processing operations are complete, in an embodiment, the viewport SCC stage 950 may utilize the data. In an embodiment, primitive data processed by one or more of the stages in the graphics processing pipeline 900 may be written to a cache (e.g., L1 cache, a vertex cache, etc.). In this case, in an embodiment, the viewport SCC stage 950 may access the data in the cache. In an embodiment, the viewport SCC stage 950 and the rasterization stage 960 are implemented as fixed function circuitry.

The viewport SCC stage 950 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 960.

The rasterization stage 960 converts the 3D geometric primitives into 2D fragments (e.g., capable of being utilized for display, etc.). The rasterization stage 960 may be configured to utilize the vertices of the geometric primitives to setup a set of plane equations from which various attributes can be interpolated. The rasterization stage 960 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 960 generates fragment data (i.e., interpolated vertex attributes associated with a particular sample location for each covered pixel) that are transmitted to the fragment shading stage 970.

The fragment shading stage 970 processes fragment data by performing a set of operations (i.e., a fragment shader or a program) on each of the fragments. The fragment shading stage 970 may generate pixel data (i.e., color values) for the fragment such as by performing lighting operations or sampling texture maps using interpolated texture coordinates for the fragment. The fragment shading stage 970 generates pixel data that is transmitted to the raster operations stage 980.

The raster operations stage 980 may perform various operations on the pixel data such as performing alpha tests, stencil tests, and blending the pixel data with other pixel data corresponding to other fragments associated with the pixel. When the raster operations stage 980 has finished processing the pixel data (i.e., the output data 902), the pixel data may be written to a render target such as a frame buffer, a color buffer, or the like.

It will be appreciated that one or more additional stages may be included in the graphics processing pipeline 900 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 940). Other types of graphics processing pipelines are contemplated as being within the scope of the present disclosure. Furthermore, any of the stages of the graphics processing pipeline 900 may be implemented by one or more dedicated hardware units within a graphics processor such as PPU 200. Other stages of the graphics processing pipeline 900 may be implemented by programmable hardware units such as the SM 740 of the PPU 600.

The graphics processing pipeline 900 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 600. The API provides an abstraction for a programmer that lets a programmer utilize specialized graphics hardware, such as the PPU 600, to generate the graphical data without requiring the programmer to utilize the specific instruction set for the PPU 600. The application may include an API call that is routed to the device driver for the PPU 600. The device driver interprets the API call and performs various operations to respond to the API call. In some instances, the device driver may perform operations by executing instructions on the CPU. In other instances, the device driver may perform operations, at least in part, by launching operations on the PPU 600 utilizing an input/output interface between the CPU and the PPU 600. In an embodiment, the device driver is configured to implement the graphics processing pipeline 900 utilizing the hardware of the PPU 600.

Various programs may be executed within the PPU 600 in order to implement the various stages of the graphics processing pipeline 900. For example, the device driver may launch a kernel on the PPU 600 to perform the vertex shading stage 920 on one SM 740 (or multiple SMs 740). The device driver (or the initial kernel executed by the PPU 700) may also launch other kernels on the PPU 700 to perform other stages of the graphics processing pipeline 900, such as the geometry shading stage 940 and the fragment shading stage 970. In addition, some of the stages of the graphics processing pipeline 900 may be implemented on fixed unit hardware such as a rasterizer or a data assembler implemented within the PPU 700. It will be appreciated that results from one kernel may be processed by one or more intervening fixed function hardware units before being processed by a subsequent kernel on an SM 740.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   determining a first display value for a pixel location in a first frame of a computer simulated video, the first display value determined based at least in part upon a first pixel value for the pixel location and a plurality of previous pixel values for the pixel location;
   receiving pixel information for a second frame of the computer simulated video, subsequent to the first frame, wherein the pixel information includes a second pixel value for the pixel location in the second frame;
   determining, based at least in part on the pixel information, a temporal lag between the first frame and the second frame; and
   determining a second display value for the pixel location in the second frame, based at least in part upon a subset of the plurality of previous pixel values corresponding to the temporal lag.

2. The method of claim 1, wherein the first display value is determined by averaging a previous pixel values from a fixed number of most recent frames.

3. The method of claim 2, wherein the fixed number is four frames.

4. The method of claim 1, wherein the at least one of the first or second display values is determined by computing a simple moving average.

5. The method of claim 1, wherein at least one of the first or second display values is determined by computing an exponential moving average.

6. The method of claim 1, further comprising:
   receiving supplemental pixel information for a third frame of the video subsequent to the second frame of video, the supplemental pixel information including a third value for the pixel location;
   determining that temporal lag between the second frame and the third frame is below a threshold based on the supplemental pixel information; and
   determining a third display value for the pixel location in the third frame based on a third average of the third value for the pixel location and at least a portion of the plurality of previous pixel values for the pixel location.

7. The method of claim 1, wherein the second display value is further determined based on the first display value and the second pixel value.

8. The method of claim 1, further comprising:
   causing the second frame to be displayed with the pixel having the second display value.

9. The method of claim 1, wherein the temporal lag is based on detecting a dynamic event in one or more frames of the video.

10. The method of claim 9, wherein the dynamic event is partial occlusion of one or more of the plurality of pixels by a shadow.

11. A system, comprising:
    one or more processors; and
    memory including instructions that, if performed by one or more processors, cause the system to at least:
    determine a first display value for a pixel location in a first frame of a computer simulated video, the first display value based at least in part upon a first pixel value for the pixel location and a plurality of previous pixel values for the pixel location;
    receive pixel information for a second frame of the computer simulated video, the second frame subsequent to the first frame, wherein the pixel information includes a second pixel value for the pixel location in the second frame;
    determine, based at least in part on the pixel information, a temporal lag between the first frame and the second frame; and
    determine a second display value for the pixel location in the second frame, the second display value based at least in part upon a subset of the plurality of previous pixel values corresponding to the temporal lag.

12. The system of claim 11, wherein at least one of the first or second display values is determined by computing an exponential moving average.

13. The system of claim 12, wherein at least one of the first or second display values is determined by computing a simple moving average.

14. A non-transitory computer-readable storage medium storing instructions that, when executed by a processor of a computing device, cause the computing device to:
    determine a first display value for a pixel location in a first frame of a computer simulated video, the first display value determined based at least in part upon a first pixel value for the pixel location and a plurality of previous pixel values for the pixel location;
    receive pixel information for a second frame of the computer simulated video, subsequent to the first frame, wherein the pixel information includes a second pixel value for the pixel location in the second frame;
    determine, based at least in part on the pixel information, a temporal lag between the first frame and the second frame; and
    determine a second display value for the pixel location in the second frame, based at least in part upon a subset of the plurality of previous pixel values corresponding to the temporal lag.

15. The non-transitory computer-readable storage medium of claim 14, wherein the first display value is determined by averaging a previous pixel values from a fixed number of most recent frames.

16. The non-transitory computer-readable storage medium of claim 15, wherein the fixed number is four frames.

17. The non-transitory computer-readable storage medium of claim 14, wherein the second display value is further determined based on the first display value and the second pixel value.

18. The non-transitory computer-readable storage medium of claim 14, wherein at least one of the first or second display values is determined by computing a simple moving average.

19. The non-transitory computer-readable storage medium of claim 14, wherein at least one of the first or second display values is determined by computing an exponential moving average.

20. The non-transitory computer-readable storage medium of claim 14, wherein the instructions when executed further cause the computing device to:
    receive supplemental pixel information for a third frame of the video subsequent to the second frame of video, the supplemental pixel information including a third value for the pixel location;

determine that temporal lag between the second frame and the third frame is below a threshold based on the supplemental pixel information; and determine a third display value for the pixel location in the third frame based on a third average of the third value for the pixel location and at least a portion of the plurality of previous pixel values for the pixel location.

* * * * *